Patented Jan. 10, 1950

2,494,116

UNITED STATES PATENT OFFICE 2,494,116

METHOD OF PRODUCNG ACRYLONITRILE

Erwin L. Carpenter, Stamford, Conn., assignor to American Cyanamid Company, New York, N. Y., a corporation of Maine No Drawing. Application November 16, 1948, Serial No. 60,379

5 Claims. (Cl. 260—465.9)

The present invention relates to an improved method for preparing acrylonitrile from ethylene cyanohydrin.

Acrylonitrile can be readily obtained in high yields by heating ethylene cyanohydrin in the presence of sodium formate as a catalyst. A preferred method of operation comprises adding the ethylene cyanohydrin in liquid phase to the catalyst heated to an ethylene cyanohydrin dehydration temperature which is within the range of from about 160°–240° C., and preferably from about 180°–220° C., at such a rate that the weight of the ethylene cyanohydrin present in the dehydration vessel does not exceed the weight of the catalyst. Thus, as the ethylene cyanohydrin is continuously dehydrated to form acrylonitrile and water, more ethylene cyanohydrin is added. The acrylonitrile and water, being considerably more volatile than the ethylene cyanohydrin, readily distill from the catalyst-ethylene cyanohydrin mixture and condense as a strataflable distillate from which the acrylonitrile is recovered.

The above process is subject to the disadvantage that after dehydrating about 10–20 mols of ethylene cyanohydrin per 100 g. of catalyst, the catalyst mass tends to swell and foam excessively, which means that the run must be discontinued. Obviously, this difficulty seriously limits the quantity of ethylene cyanohydrin which can be dehydrated with this catalyst, and the amount of acrylonitrile produced is usually from 7–10 lbs. per lb. of sodium formate.

A class of organic compounds has now been discovered which effectively controls the foaming tendency of the sodium formate catalyst in the above process. These anti-foaming materials are the monoalkyl and dialkyl ethers of the polyethylene and polypropylene glycols which are water-soluble and have boiling points greater than 200° C.

It is essential that the foam inhibitor be water-soluble, otherwise it would tend to steam distill with the water formed in the dehydration of the cyanohydrin and cause both contamination of the acrylonitrile product and loss of inhibitor from the catalyst zone. These anti-foaming materials are also particularly suited to the process since they are readily compatible with the catalyst mixture.

The anti-foaming compound is usually employed in an amount corresponding to 2–10% of the weight of the sodium formate catalyst, but it may be used in smaller or larger proportions if desired.

Typical members of the above class of anti-foaming materials are the mono-n-butyl ether of diethylene glycol, the mono-n-propyl ether of diethylene glycol, the monoethyl ether of triethylene glycol, the mono-n-butyl ether of triethylene glycol, the monomethyl ether of tetraethylene glycol, the monoethyl ether of tetraethylene glycol, the mono-sec.-butyl ether of tetraethylene glycol, the monomethyl ether of tripropylene glycol, the monoethyl ether of dipropylene glycol, the monoisopropyl ether of dipropylene glycol, the monoisopropyl ether of tripropylene glycol, the di-n-butyl ether of diethylene glycol, the di-n-propyl ether of diethylene glycol, the di-n-propyl ether of triethylene glycol, the di-n-butyl ether of triethylene glycol, the dimethyl ether of tetraethylene glycol, the diethyl ether of pentaethylene glycol, the dimethyl ether of tripropylene glycol, the diethyl ether of tripropylene glycol, as well as other mono and dialkyl ethers of polyethylene and polypropylene glycols which are water-soluble and have boiling points greater than 200° C.

100 g. of sodium formate were used in each example shown in the following table. No foam inhibitor was employed with the catalyst in Example 1 and, as a result, the run had to be discontinued due to excessive foaming of the catalyst mass after 17 mols of ethylene cyanohydrin had been dehydrated. The use of the foam inhibitor with the catalyst in Examples 2–7 allowed smooth, uninterrupted dehydration of the ethylene cyanohydrin.

| Ex. | Foam Inhibitor | Grams Used | Mols. of ECH Fed | Feed Rate of ECH, g./min. | Cat. Temp., °C. | Per cent Yield of AN | Lbs. AN per lb. Catalyst |
|---|---|---|---|---|---|---|---|
| 1 | | | 17 | 3.0 | 200 | 95.0 | 9.0 |
| 2 | Monoethyl ether of triethylene glycol | 5 | 65 | 3.6 | 215 | 97.5 | 33.8 |
| 3 | Monomethyl ether of tripropylene glycol | 5 | 72 | 3.6 | 205 | 97.6 | 37.2 |
| 4 | Monoethyl ether of triethylene glycol | 25 | 71 | 2.3 | 200 | 95.4 | 35.6 |
| 5 | Mono-n-butyl ether of diethylene glycol | 25 | 85 | 2.9 | 205 | 95.0 | 42.7 |
| 6 | Diemthyl ether of tetraethylene glycol | 10 | 78 | 3.6 | 205 | 97.9 | 40.4 |
| 7 | Monoethyl ether of a polyethylene glycol having a molecular weight of about 550 | 5 | 84 | 3.6 | 205 | 97.5 | 43.4 |

The use of the anti-foaming compound in the present process greatly increases the life of the catalyst and thereby provides a method of producing acrylonitrile which is highly suitable for commercial operation.

The polyethylene and polypropylene glycols, although somewhat effective in controlling the foaming tendency of the sodium formate catalyst, are inferior to the alkyl ethers of said glycols.

This application is a continuation-in-part of my copending application Serial No. 9,620, filed February 19, 1948, now abandoned.

While the invention has been described with particular reference to specific embodiments, it is to be understood that it is not to be limited thereto, but is to be construed broadly and restricted solely by the scope of the appended claims.

I claim:

1. A method of producing acrylonitrile which includes feeding ethylene cyanohydrin in liquid phase to a dehydrating zone heated to a temperature within the range of from 160° C. to 240° C., said zone containing sodium formate as an ethylene cyanohydrin dehydration catalyst and an anti-foaming compound chosen from the group consisting of the monoalkyl and dialkyl ethers of the polyethylene and polypropylene glycols which are water-soluble and have boiling points greater than 200° C., removing acrylonitrile and water from said zone, and recovering the acrylonitrile.

2. The method of claim 1 in which the anti-foaming compound is employed in an amount corresponding to 2-10% of the weight of the sodium formate catalyst.

3. A method of producing acrylonitrile which includes feeding ethylene cyanohydrin in liquid phase to a dehydrating zone heated to a temperature within the range of from 160° C. to 240° C., said zone containing sodium formate and the monomethyl ether of a polyethylene glycol having a molecular weight of about 550, removing acrylonitrile and water from said zone, and recovering the acrylonitrile.

4. A method of producing acrylonitrile which includes feeding ethylene cyanohydrin in liquid phase to a dehydrating zone heated to a temperature within the range of from 160° C. to 240° C., said zone containing sodium formate and the dimethyl ether of tetraethylene glycol, removing acrylonitrile and water from said zone, and recovering the acrylonitrile.

5. A method of producing acrylonitrile which includes feeding ethylene cyanohydrin in liquid phase to a dehydrating zone heated to a temperature within the range of from 160° C. to 240° C., said zone containing sodium formate and the monomethyl ether of tripropylene glycol, removing acrylonitrile and water from said zone, and recovering the acrylonitrile.

ERWIN L. CARPENTER.

No references cited.